United States Patent
Kim et al.

(10) Patent No.: US 10,020,488 B2
(45) Date of Patent: Jul. 10, 2018

(54) METHOD FOR PRODUCING ANODIC COMPOSITE MATERIAL FOR LITHIUM SECONDARY BATTERY, METHOD FOR PRODUCING ELECTRODE USING SAME, AND METHOD FOR CHARGING AND DISCHARGING ELECTRODE

(71) Applicant: Korea Institute of Industrial Technology, Chungcheongnam-do (KR)

(72) Inventors: Ho Sung Kim, Gwangju (KR); Sun Woo Yang, Buk-gu Gwangju (KR); Kyeong Wan Kim, Gwangsan-gu Gwangju (KR); Chae Hwan Jeong, Gwangsan-gu Gwangju (KR); Tae Won Kim, Gwangsan-gu Gwangju (KR); Duck Rye Chang, Nam-gu Gwangju (KR); Min Young Kim, Dong-gu Gwangju (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 197 days.

(21) Appl. No.: 14/766,874

(22) PCT Filed: Aug. 20, 2013

(86) PCT No.: PCT/KR2013/007462
§ 371 (c)(1),
(2) Date: Aug. 10, 2015

(87) PCT Pub. No.: WO2014/126312
PCT Pub. Date: Aug. 21, 2014

(65) Prior Publication Data
US 2015/0380720 A1    Dec. 31, 2015

(30) Foreign Application Priority Data
Feb. 13, 2013  (KR) .................. 10-2013-0015090

(51) Int. Cl.
*H02J 7/00* (2006.01)
*H01M 4/04* (2006.01)
(Continued)

(52) U.S. Cl.
CPC .......... *H01M 4/0471* (2013.01); *C01G 53/50* (2013.01); *H01M 4/0404* (2013.01);
(Continued)

(58) Field of Classification Search
USPC ................................................ 320/127–136
See application file for complete search history.

(56) References Cited

U.S. PATENT DOCUMENTS 6,241,959 B1   6/2001 Cho et al.
6,291,103 B1   9/2001 Park et al.
(Continued)

FOREIGN PATENT DOCUMENTS

EP    2144314 A2    1/2010
JP    2013500554 A   1/2013
(Continued)

OTHER PUBLICATIONS

Liu et al., Functional Surface Modifications of High Capacity Layered Li[Li0.2Mn0.54Ni0.13Co0.13]o2 Cathode, Journal of Materials Chemistry, vol. 20, (2010), pp. 3961-3967.
(Continued)

*Primary Examiner* — Binh Tat
(74) *Attorney, Agent, or Firm* — TraskBritt

(57) ABSTRACT

This disclosure synthesizes an anodic composite material $Li(Li_xNi_yCo_zMn_wO_{2+\alpha})$ of $Li_2MnO_3$ series whose theoretical capacity is a level of about 460 mAh/g, and to produce an electrode of a high capacity using the synthesized anodic composite material. Also provided is a method for charging and discharging the electrode. Here, the method for producing an anodic composite material for a lithium secondary (Continued)

battery includes the steps of: mixing a nickel nitrate solution, a manganese nitrate solution, and a cobalt nitrate solution to produce a starting material solution; and mixing the starting material solution with a complexing agent so as to produce an anodic composite material $Li(Li_xNi_yCo_zMn_wO_{2+\alpha})$ of $Li_2MnO_3$ series by means of coprecipitation.

20 Claims, 3 Drawing Sheets

(51) Int. Cl.
| | |
|---|---|
| H01M 4/505 | (2010.01) |
| H01M 4/525 | (2010.01) |
| H01M 4/1391 | (2010.01) |
| H01M 10/052 | (2010.01) |
| C01G 53/00 | (2006.01) |
| H01M 4/131 | (2010.01) |
| H01M 4/485 | (2010.01) |
| H01M 10/44 | (2006.01) |
| H01M 4/38 | (2006.01) |
| H01M 10/04 | (2006.01) |
| H01M 4/02 | (2006.01) |
| H01M 2/16 | (2006.01) |

(52) U.S. Cl.
CPC ......... *H01M 4/0435* (2013.01); *H01M 4/131* (2013.01); *H01M 4/1391* (2013.01); *H01M 4/382* (2013.01); *H01M 4/485* (2013.01); *H01M 4/505* (2013.01); *H01M 4/525* (2013.01); *H01M 10/0427* (2013.01); *H01M 10/052* (2013.01); *H01M 10/44* (2013.01); *C01P 2002/72* (2013.01); *C01P 2006/40* (2013.01); *H01M 2/1653* (2013.01); *H01M 2004/027* (2013.01); *Y02T 10/7011* (2013.01)

(56) References Cited

U.S. PATENT DOCUMENTS

| | | | |
|---|---|---|---|
| 2010/0227222 A1 | 9/2010 | Chang et al. | |
| 2011/0037440 A1 | 2/2011 | Endo et al. | |
| 2012/0263998 A1* | 10/2012 | Thackeray | H01M 4/131 |
| | | | 429/156 |
| 2012/0326673 A1* | 12/2012 | Li | H01M 4/13 |
| | | | 320/137 |
| 2014/0306664 A1* | 10/2014 | Kim | H01M 4/505 |
| | | | 320/128 |

FOREIGN PATENT DOCUMENTS

| | | |
|---|---|---|
| KR | 100815583 B1 | 3/2008 |
| WO | 2012165654 A1 | 12/2012 |

OTHER PUBLICATIONS

International Search Report for International Application No. PCT/KR2013/007462, dated Nov. 6, 2013, 3 pages.
International Written Opinion for International Application No. PCT/KR2013/007462, dated Nov. 6, 2013, 5 pages.
International Preliminary Report on Patentability for International Application No. PCT/KR2013/007462 dated Aug. 18, 2015, 6 pages.
Japanese Office Action for Japanese Application No. 2015-555900 dated Jul. 26, 2016, 3 pages.
Japanese Office Action for Japanese Application No. 2015-55900 dated Nov. 2, 2016, 4 pages.
Japanese Office Action for Japanese Application No. 2015-55900 dated Mar. 7, 2017, 6 pages.
Korean Written Opinion for Korean Application No. 10-2013-0015090 dated Oct. 29, 2014, 8 pages.

\* cited by examiner

METHOD FOR PRODUCING ANODIC COMPOSITE MATERIAL FOR LITHIUM SECONDARY BATTERY, METHOD FOR PRODUCING ELECTRODE USING SAME, AND METHOD FOR CHARGING AND DISCHARGING ELECTRODE

CROSS-REFERENCE TO RELATED APPLICATIONS

This application is a national phase entry under 35 U.S.C. § 371 of International Patent Application PCT/KR2013/007462, filed Aug. 20, 2013, designating the United States of America and published as International Patent Publication WO 2014/126312 A1 on Aug. 21, 2014, which claims the benefit under Article 8 of the Patent Cooperation Treaty and under 35 U.S.C. § 119(e) to Korean Patent Application Serial No. 10-2013-0015090, filed Feb. 13, 2013, the disclosure of each of which is hereby incorporated herein in its entirety by this reference.

TECHNICAL FIELD

Exemplary embodiments relate to a high-capacity anode composite material for an $Li_2MnO_3$-based lithium secondary battery, which enables high-energy density by high capacity, a method of manufacturing an electrode using the anode composite material, and a method of charging and discharging the manufactured electrode.

BACKGROUND

A lithium secondary battery is expected to be applied not only to small IT equipment, such as a mobile phone and a notebook PC, but also as a medium- and large-size battery for an electric car and an electric power storage system. Particularly, there is a demand for development of an anode material with high safety and high energy density needed for a medium- and large-size battery for an electric car and an electric power storage system. Generally, for a lithium secondary battery, electrode materials that are based on $LiCoO_2$ and have safety and excellent capacity, that is, $LiMn_2O_4$ (LMO) and high-capacity $LiMn_{1/3}Co_{1/3}Ni_{1/3}O_2$ (NMC), have been studied. However, as such materials have a low basic capacity or are not yet satisfactory in safety, safe materials with high energy density for commercialization of medium- and large-size batteries are sought.

In particular, a driving distance on a single charge, which is very important for an electric car, is associated with the energy density of an anode material for a secondary battery, research and development for achieving high performance of the anode materials is essential. Traditional LMO, NMC or olivine-based anode materials have an energy density of about 120 to 150 mAh/g, which is insufficient to dramatically increase the driving distance of an electric car.

An $Li_2MnO_3$-based anode composite material has a high basic theoretical capacity of about 460 mAh/g, a high actual initial capacity of 200 mAh/g or higher, and a relatively high average discharge voltage of about 3.5 V. Therefore, the $Li_2MnO_3$-based anode composite material is known as one of next-generation anode material candidates capable of achieving high capacity and high energy density and, thus, technologies of synthesizing, with high efficiency, such anode materials that are highly likely to achieve high performance are examined.

A medium- and large-size lithium secondary battery for an electric car and an electric power storage system is first required to have safety and high energy density. Thus, in the prior art, to secure safety of a medium- and large-size lithium secondary battery, research and development of a process of preparing a mixture of a lithium manganese oxide (LMO) spinel material and an NMC material with a relatively high capacity at an appropriate composition or a process of preparing an olivine-type lithium-ion iron phosphate ($LiFePO_4$), which exhibits a relatively low discharge voltage of about 3.0 V but has excellent safety and high capacity, is being conducted. However, due to low basic capacity, batteries of these traditional LMO, NMC and olivine-type $LiFePO_4$ materials have limitations in improving the driving distance on a single charge of an electric car.

Traditional anode materials have a basic energy density of about 120 to 150 mAh/g, which is insufficient, and thus have limitations in commercialization of applications thereof that need a high energy density, such as electric cars. In particular, since iron phosphate materials, which have attracted attention in recent years, have a low voltage and clear limitation in capacity increase (3 V and 150 mAh/g), it is urgent to develop an anode material with a superior energy density. For reference, batteries of conventional electrode materials mostly operate in a charge voltage range of 2.0 to 4.2 V.

Traditional anode materials have problems in terms of safety, cost and high energy density. Specifically, nickel-based materials, such as $LiNiO_2$ (LNO), having excellent capacity, are not practical in safety; manganese LMO materials are not practical in capacity and durability; NMC materials have problems in safety and cost; and iron phosphate materials have problems in energy density and cost.

In particular, manganese materials are excellent in safety but have a low capacity and are not sufficiently identified in terms of durability, and thus research and development of manganese materials are vigorously being conducted. Also, although studies on a nanotechnology for iron phosphate materials to obtain high-capacity electrode performance are being carried out, the nanotechnology for the materials involves an additional cost increase. Thus, batteries of these traditional materials are charged and discharged in a range of about 2.0 to 4.2 V to secure safety in view of properties of the materials and thus basically have limitations in discharge capacity.

BRIEF SUMMARY

Technical Goals

An aspect of the present disclosure is to develop an anode composite material for a next-generation high-capacity lithium secondary battery having high-capacity and high-energy density properties and high safety. Also, other aspects of the present disclosure provide a method of manufacturing an electrode for a lithium secondary battery using the developed anode composite material and a method of charging and discharging the electrode.

Technical Solutions

According to an aspect of the present disclosure, there is provided a method of preparing an anode composite material for a lithium secondary battery, the method including: preparing a precursor of an $Li_2MnO_3$-based anode composite material $Li(Li_xNi_yCo_zMn_wO_{2+\alpha})$ using coprecipitation by mixing a complexing agent with a starting material solution, obtained by mixing a nickel nitrate solution, a manganese nitrate solution and a cobalt nitrate solution, and adding an NaOH aqueous solution to a mixing solution of the starting material solution and the complexing agent so as to adjust pH of the mixing solution; mixing the precursor with LiOH·H$_2$O; subjecting mixed powder to a first sintering; and subjecting the first-sintered powder to a second sintering.

In the anode composite material Li(Li$_x$Ni$_y$Co$_z$Mn$_w$O$_{2+\alpha}$), x may be 0.2 to 0.5, y may be 0.1 to 0.2, z may be 0.1 to 0.2, and w may be 0.5 to 0.7. The anode composite material Li(Li$_x$Ni$_y$Co$_z$Mn$_w$O$_{2+\alpha}$) may be Li$_{1.5}$(Ni$_{0.17}$Mn$_{0.66}$Co$_{0.17}$)O$_2$.

The first sintering may be performed at a temperature of 500° C. The second sintering may be performed at a temperature of 650° C. to 1000° C.

The anode composite material Li(Li$_x$Ni$_y$Co$_z$Mn$_w$O$_{2+\alpha}$) has two super lattice peaks as a result of X-ray diffraction (XRD). The two super lattice peaks are detected at a temperature of the second sintering of 800° C. or higher.

The starting material solution may be obtained by mixing Ni(NO$_3$)$_2$·H$_2$O, Mn(NO$_3$)$_2$·H$_2$O and Co(NO$_3$)$_2$·H$_2$O at a molar ratio of 1:4:1. The complexing agent may be ammonia water, and 0.8 mole of the complexing agent may be mixed with the starting material solution. The NaOH aqueous solution may be a 1 M solution obtained by dissolving NaOH powder in a solution. 103% by weight (wt %) of LiOH·H$_2$O may be added to the precursor.

According to another aspect of the present disclosure, there is provided a method of manufacturing an electrode of a lithium secondary battery using the anode composite material for the lithium secondary battery, the method including: preparing Li$_2$MnO$_3$-based anode composite material Li(Li$_x$Ni$_y$Co$_z$Mn$_w$O$_{2+\alpha}$) powder using coprecipitation; preparing slurry by mixing the anode composite material Li(Li$_x$Ni$_y$Co$_z$Mn$_w$O$_{2+\alpha}$) powder with a conductive agent and a binder; applying the slurry; drying the applied slurry; pressing the dried slurry; manufacturing an anode by punching the pressed slurry; and manufacturing an electrode cell using the anode. Here, the preparing of the Li$_2$MnO$_3$-based anode composite material Li(Li$_x$Ni$_y$Co$_z$Mn$_w$O$_{2+\alpha}$) powder includes: preparing a precursor of an Li$_2$MnO$_3$-based anode composite material Li(Li$_x$Ni$_y$Co$_z$Mn$_w$O$_{2+\alpha}$) using coprecipitation by mixing a complexing agent with a starting material solution, obtained by mixing a nickel nitrate solution, a manganese nitrate solution and a cobalt nitrate solution, and adding an NaOH aqueous solution to a mixing solution of the starting material solution and the complexing agent so as to adjust pH of the mixing solution; mixing the precursor with LiOH·H$_2$O; subjecting mixed powder to a first sintering; and subjecting the first-sintered powder to a second sintering.

The manufacturing of the electrode cell may be by forming a coin cell or three-electrode cell. The coin cell may use the manufactured anode, a cathode of lithium metal, a PE separator as a separator membrane and an electrolyte that is a solution obtained by dissolving 1 mole of LiPF$_6$ in a mixture solvent of ethylene carbonate (EC) and dimethyl carbonate (DMC) (at a volume ratio of 1:1). The three-electrode cell may use the manufactured anode, an auxiliary electrode of lithium metal, a reference electrode of lithium metal, a PE separator as a separator membrane, and an electrolyte that is a solution obtained by dissolving 1 mole of LiPF$_6$ in a mixture solvent of ethylene carbonate (EC) and dimethyl carbonate (DMC) (at a volume ratio of 1:1).

The slurry may be obtained by mixing the composite material Li(Li$_x$Ni$_y$Co$_z$Mn$_w$O$_{2+\alpha}$) powder, a conductive agent, and a binder at a weight ratio of 80:10:10. The applying of the slurry applies the slurry to aluminum foil to a thickness of 100 to 110 μm. The applying of the slurry applies the slurry to a thickness of 60 to 70 μm in pressing the slurry to the aluminum foil.

According to still another aspect of the present disclosure, there is provided a method of charging and discharging a lithium secondary battery that repeats charging and discharging of an electrode cell with a constant current and a constant voltage in a range of 2.0 to 4.6 V, the electrode cell being manufactured using an Li$_2$MnO$_3$-based anode composite material Li(Li$_x$Ni$_y$Co$_z$Mn$_w$O$_{2+\alpha}$) prepared using coprecipitation by mixing a complexing agent with a starting material solution, obtained by mixing a nickel nitrate solution, a manganese nitrate solution and a cobalt nitrate solution, and adding an NaOH aqueous solution to a mixing solution of the starting material solution and the complexing agent so as to adjust pH of the mixing solution.

Oxidation and reduction behavior of lithium as an anode material of the electrode cell may be identified using a three-electrode cell at a scan rate of 0.05 mV/S in a charge and discharge voltage range of 2.0 to 4.9 V by a potential sweep method.

Effects of Invention

As described above, according to aspects of the present disclosure, an Li$_2$MnO$_3$-based anode composite material having a high capacity of about 200 to 240 mAh/g in a range of 2.0 to 4.9 V may be manufactured.

Also, according to aspects of this disclosure, it is identified that an Li$_2$MnO$_3$-based anode composite material tends to have a monoclinic structure depending on heat treatment temperature unlike LiCoO$_2$ (LCO) or LiMnO$_2$ (LMO) anode materials, and thus a battery system expected to exhibit a remarkably high capacity may be manufactured using anode composite material powder having a suitable monoclinic structure depending on appropriate heat treatment temperature.

Further, according to aspects of the present disclosure, when an electrode depending on heat treatment temperature is manufactured using an Li$_2$MnO$_3$-based anode composite material and a coin cell is manufactured using the electrode and charged and discharged in a range of 2.0 to 4.6 V to evaluate electrochemical properties, a cell heat treated at 800° C. has a highest initial capacity of 260 mAh/g or higher and a cell heat treated at 850° C. exhibits superior charge and discharge properties as electrochemical properties, specifically high-efficiency charge and discharge and life.

DETAILED DESCRIPTION

Hereinafter, exemplary embodiments will be described in detail with reference to the accompanying drawings, but the present disclosure is not limited or restricted to the embodiments. In describing the embodiments, detailed description related to a related known function or configuration may be omitted to clarify the gist of the present disclosure.

Hereinafter, a method of preparing an $Li_2MnO_3$-based anode composite material for a lithium secondary battery, a method of manufacturing an electrode of a lithium secondary battery using the prepared anode composite material, and a method of charging and discharging the electrode according to embodiments of the present invention will be described in detail with reference to FIGS. 1 to 4.

Preparation of $Li_2MnO_3$-Based Anode Composite Material Powder

Figure 1:
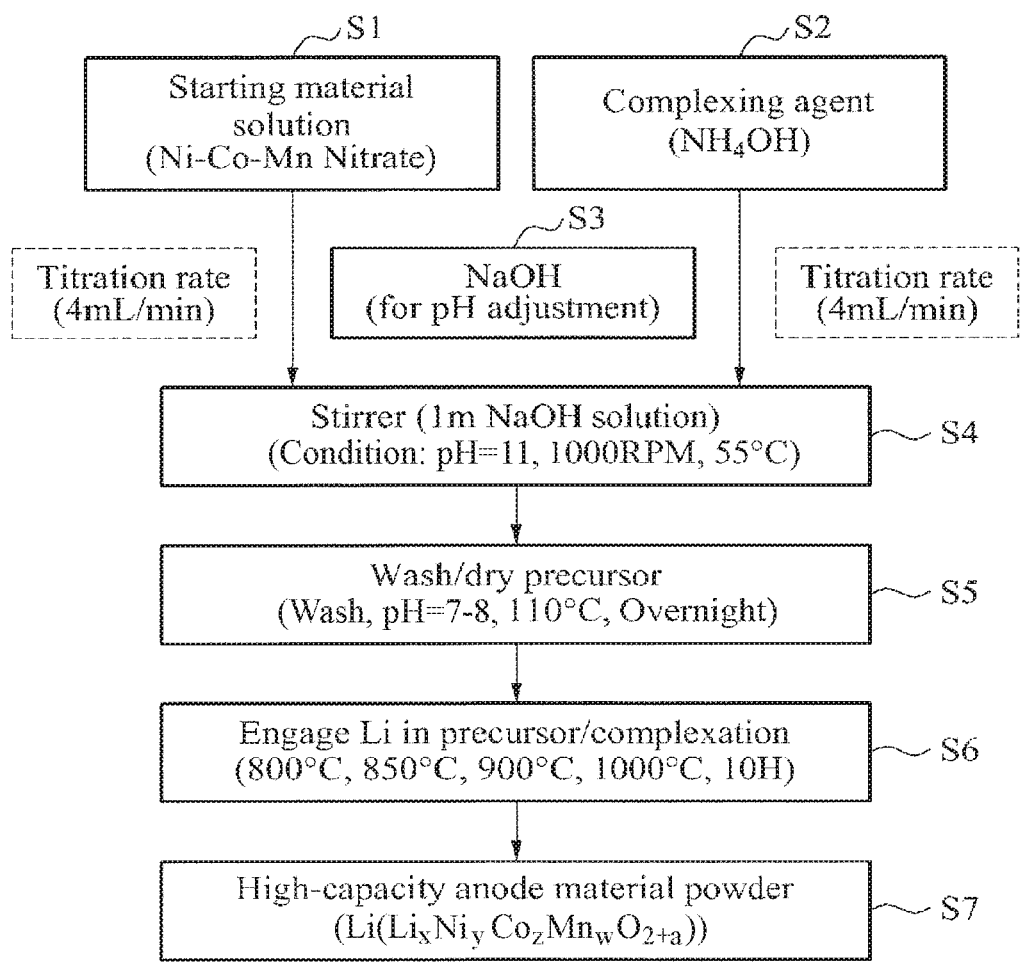
FIG. 1 is a flowchart illustrating a synthesis technology of an Li$_2$MnO$_3$-based anode composite material Li(Li$_x$Ni$_y$Co$_z$Mn$_w$O$_{2+\alpha}$).

Referring to FIG. 1, a process of synthesizing an $Li_2MnO_3$-based anode composite material uses coprecipitation.

Starting materials $Ni(NO_3)_2 \cdot H_2O$, $Mn(NO_3)_2 + H_2O$ and $Co(NO_3)_2 \cdot H_2O$ are prepared at a molar ratio of 1:4:1 and dissolved in 500 ml of distilled water (S1). A 5 N ammonia water as a complexing agent is dissolved in 500 ml of distilled water to prepare 500 ml of a 0.8 mol aqueous solution (S2). 500 ml of a 1 mol solution of NaOH powder is prepared for pH adjustment in a reactor (S3). Here, the process is performed with the reactor set to a temperature of 55° C., a pH of 11, and a stirring speed of about 1000 rpm.

Next, a coprecipitation reaction is started with titration of the starting materials, in which when the coprecipitation reaction is started in the reactor, the starting materials are titrated at about 4 ml/minute, and the ammonia water as the complexing agent is titrated at about 4 ml/minute. Further, the 1 mol NaOH solution, which is prepared for pH adjustment in the coprecipitation reaction, is set to be automatically titrated according to a pH change in the reactor.

Subsequently, after the coprecipitation reaction is performed as described above, in a state that the coprecipitation reaction is completed, the product of coprecipitation is subjected to aging at the same impeller stirring speed and the same temperature condition for 24 hours (S4).

The product of the coprecipitation reaction is washed, in which washing was performed until the product has a pH of about 7 to 8. The washed precipitate is dried overnight in a general dryer at about 110° C. (S5), thereby preparing first-stage precursor powder (S6).

In the foregoing process of preparing precursor powder, the prepared precursor and $LiOH \cdot H_2O$ (103% by weight (wt %)) are put into a ball mill device and mixed using zirconia balls with a suitable size in order to engage lithium in the precursor. Here, mixing may be performed uniformly at 400 rpm for 5 minutes twice in the ball mill device.

Next, the mixed powder is subjected to heat treatment at 500° C. for 10 hours (heating rate of 1° C./minute), after which the synthesized powder obtained via first sintering is subjected to a second sintering at 800° C., 850° C., 900° C. and 1000° C. for 10 hours (heating rate of 1° C./minute), thereby finally preparing high-capacity anode composite material powder $Li(Li_xNi_yCo_zMn_wO_{2+\alpha})$ (S7). Specifically, anode composite material powder $Li_{1.5}(Ni_{0.17}Mn_{0.66}Co_{0.17})O_2$ is obtained.

That is, a high-capacity anode composite material that is Li-rich and Mn-rich and has low Co content is obtained. Preferably, Mn content is controlled in a range of 0.5 to 0.7 mol, and Co content is maintained in a range of 0.1 to 0.2 mol. Composition of the $Li_2MnO_3$-based anode composite material synthesized under the foregoing conditions is identified by inductively coupled plasma (ICP) analysis, and a structure and shape thereof are identified by X-ray diffraction (XRD) and scanning electron microscopy (SEM) analysis. Results are illustrated in FIGS. 2 and 3.

Figure 2:
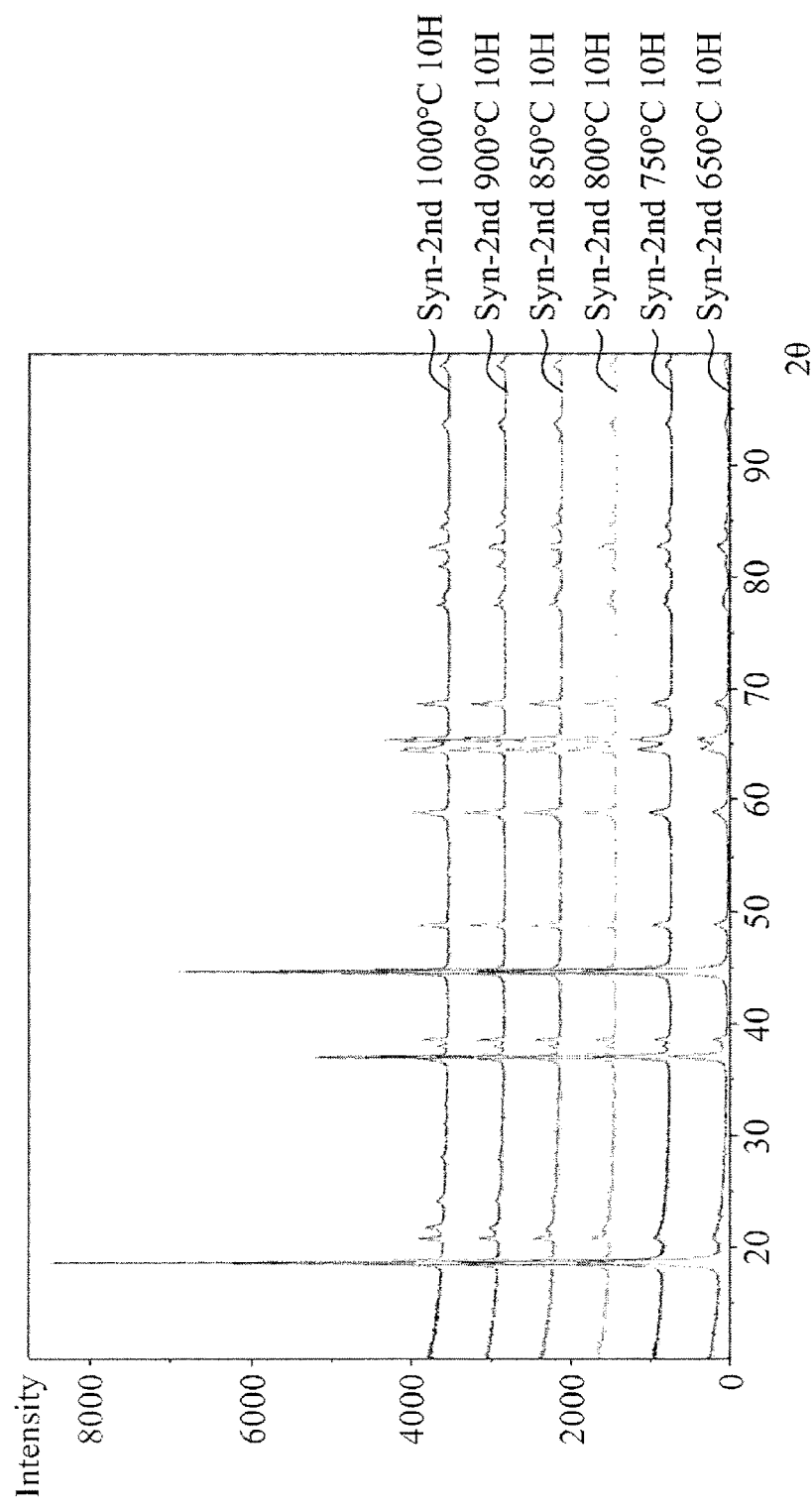
FIG. 2 is a graph illustrating X-Ray diffraction (XRD) analysis results of the Li$_2$MnO$_3$-based anode composite materials Li(Li$_x$Ni$_y$Co$_z$Mn$_w$O$_{2+\alpha}$) prepared according to the examples of the present disclosure.

FIG. 2 is a graph illustrating XRD analysis results of the $Li_2MnO_3$-based anode composite materials $Li(Li_xNi_yCo_zMn_wO_{2+\alpha})$ prepared according to the examples of the present disclosure, in which XRD analysis is performed after the prepared anode composite material is subjected to heat treatment at 650° C., 750° C., 800° C., 900° C. and 1000° C. Referring to FIG. 2, super lattice peaks in a monoclinic structure of $Li_2MnO_3$ are identified at around 22° of 2θ. As heat treatment temperature rises, the peaks gradually increase in height and become clear. In particular, the super lattice peaks are significantly broad at a heat treatment temperature of 800° C. and become clear at 800° C. or higher, and two perfect super lattice peaks are formed at 1000° C.

Figure 3:
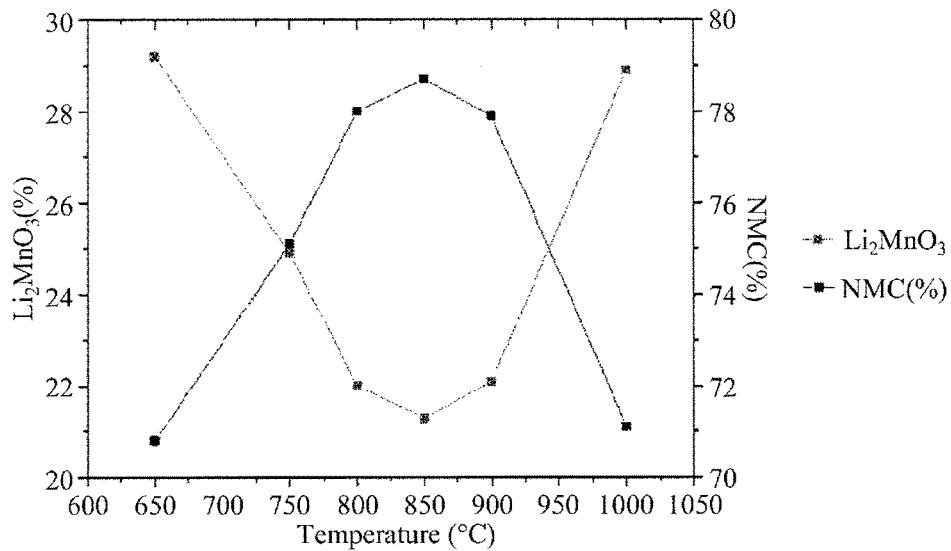
FIG. 3 is a graph illustrating interpretation results of the XRD analysis of the Li$_2$MnO$_3$-based anode composite materials Li(Li$_x$Ni$_y$Co$_z$Mn$_w$O$_{2+\alpha}$) prepared according to the examples of the present disclosure.

Interpretation results of the XRD analysis of the anode composite material performed in FIG. 2 are illustrated in FIG. 3 and Table 1. FIG. 3 is a graph illustrating the interpretation results of the XRD analysis of the $Li_2MnO_3$-based anode composite materials $Li(Li_xNi_yCo_zMn_wO_{2+\alpha})$ prepared according to the examples of the present disclosure, and Table 1 indicates the interpretation results.

TABLE 1

| Heat treatment (° C., H) | $Li_2MnO_3$ (%) | NMC (%) | a (Å) | c (Å) | c/a ratio | Volume (Å)$^3$ | Crystal particle size (nm) |
|---|---|---|---|---|---|---|---|
| 650° C., 10 H | 29.2 | 70.8 | 2.8496 | 14.2055 | 4.985079 | 99.87434 | 25.0 |
| 750° C., 10 H | 24.9 | 75.1 | 2.8494 | 14.2262 | 4.992693 | 99.99577 | 37.3 |
| 800° C., 10 H | 22.0 | 78.0 | 2.8503 | 14.2232 | 4.993622 | 100.1395 | 66.9 |
| 850° C., 10 H | 21.3 | 78.7 | 2.8502 | 14.2328 | 4.993593 | 100.1331 | 79.8 |
| 900° C., 10 H | 22.1 | 77.9 | 2.8507 | 14.2344 | 4.993370 | 100.1770 | 90.7 |
| 1000° C., 10 H | 28.9 | 71.1 | 2.8511 | 14.2364 | 4.993217 | 100.2226 | 82.0 |

Referring to FIG. 3 and Table 1, as the heat treatment temperature of the anode composite material increases, ratios of the monoclinic structure of $LiMnO_3$ and a hexagonal structure of $LiMO_2$ and a lattice parameter change. In particular, in the embodiment of the present disclosure, as the heat treatment temperature of the anode composite material increases, ratios of phase structures of $LiMnO_3$ and $LiMO_2$ change, that is, the ratio of the monoclinic structure of $LiMnO_3$ is 21.3%, which is lowest, at 850° C. and increases at a sintering temperature of higher than or lower than 850° C. Thus, the present disclosure pays attention to electrochemical properties of the anode composite material sintered at 850° C.

Manufacture of Electrode

A method of manufacturing an electrode using the $Li_2MnO_3$ anode composite materials prepared above will be described. Here, four electrode cells are manufactured using $Li_2MnO_3$-based anode composite material powder prepared by the method of preparing the $Li_2MnO_3$-based anode composite material illustrated in FIG. 1 and sintered at 800° C., 850° C., 900° C. and 1000° C., respectively.

First, the prepared anode composite material powder and a conductive agent (Super P) are prepared at a weight ratio and thoroughly stirred and mixed using a stirrer or mortar. Next, the mixed powder is transferred to a mixer (THINKY®, Japan) for slurry preparation and titrated with polyvinylidene fluoride (PVDF, 8 wt %) as a binder material at an appropriate ratio. Here, the $Li_2MnO_3$ composite material as an anode active material, the conductive agent and the binder are prepared at a ratio of 80:10:10 wt % and stirred by the mixer at 2000 rpm for 30 minutes, thereby preparing slurry. Here, stirring is performed for 30 minutes in total by repeating a process of stirring by the mixer for 5 minutes and identification of viscosity about five to six times, in which viscosity is adjusted by NMP titration.

Here, optimal conditions need to be maintained so that viscosity or physical properties of the mixture in the stirrer are not changed by heat generated by operation of the stirrer. To this end, it is needed to optimize stirring time for the slurry mixture and a kind and size of balls in the stirrer. Preferably, a zirconia ball is used and the size of the ball is suitably adjusted. Further, to suppress a change in the physical properties (viscosity) of the slurry mixture in the stirrer, zirconia ball application time may be limited to a minimum of 5 minutes.

The prepared slurry is formed into a film on aluminum foil (Al foil) with a thickness of 20 μm by a casting process, in which the slurry is uniformly applied with a constant force in a fixed direction.

The electrode with the slurry applied is immediately dried thoroughly (overnight) in a general dryer at 110° C. The thoroughly dried electrode is adjusted to have a thickness of about 100 to 110 μm in the slurry application process and subjected to pressing using a press (roll press), in which the thickness is reduced by about 40% finally to about 60 to 70 μm.

Next, the electrode prepared via pressing is punched into a coin cell suitably to size of an electrode cell in a dry room and thoroughly dried at 80° C. for 4 hours in a vacuum dryer, thereby finishing manufacture of the electrode.

When an electrode is manufactured using an $Li_2MnO_3$ anode composite material, it is important to maintain an appropriate thickness of the electrode in order to optimize workability of manufacture of the electrode and performance of a battery. That is, when the thickness of the electrode is increased, capacity of the battery increases, whereas fluidity of slurry of an electrode active material is decreased in a pressing process after application of the slurry to the electrode, making it difficult to uniform application of the slurry to a collector electrode, and thus reducing binding property between a collector and an active material and adhesive properties between active materials. Thus, it is necessary to form an electrode with a suitable thickness depending on materials.

A coin cell and a three-electrode cell are manufactured to evaluate electrochemical properties of the prepared electrode. In detail, a coin cell defined by the IEC standard 2032 is manufactured using a cathode of lithium metal, a PE separator and an electrolyte that is a solution obtained by dissolving 1 mole of $LiPF_6$ in a mixture solvent of ethylene carbonate (EC) and dimethyl carbonate (DMC) (at a volume ratio of 1:1) according to assembly order. For a three-cell, a particularly designed cell is employed and a working electrode of the anode composite material prepared in the foregoing embodiment, an auxiliary electrode of Li metal, a reference electrode of Li metal, and a PE separator and an electrolyte that is a solution obtained by dissolving 1 mole of $LiPF_6$ in a mixture solvent of ethylene carbonate (EC) and dimethyl carbonate (DMC) (at a volume ratio of 1:1) are used, which are the same as those used for the coin cell.

Example 1

An electrode and a cell were manufactured using an $Li_2MnO_3$-based anode composite material $Li(Li_xNi_yCo_zMn_wO_{2+\alpha})$ powdery substance prepared by subjecting anode composite material powder synthesized by coprecipitation according to embodiments of the present disclosure to heat treatment at a sintering temperature of 800° C.

An $Li_2MnO_3$-based anode composite material as an anode active material, a conductive agent, and a binder were prepared at a ratio of 80:10:10 wt % and mixed under conditions (2000 rpm and 30 minutes), thereby preparing slurry. The prepared slurry was formed into a film on Al foil with a thickness of 20 μm by a casting process, in which the slurry was uniformly applied with a constant force in a fixed direction. The electrode with the slurry applied was immediately dried thoroughly (overnight) in a general dryer at 110° C. The thoroughly dried electrode was adjusted to have a thickness of about 100 to 110 μm and subjected to pressing using a press (roll press) to have a final thickness of about 60 to 70 μm. The electrode prepared via pressing was punched suitably to the size of a cell in a dry room and thoroughly dried at 80° C. for 4 hours in a vacuum dryer. A coin cell and a three-electrode cell were prepared to evaluate electrochemical properties of the prepared electrode. A coin cell defined by the IEC standard 2032 was manufactured using a cathode of lithium metal, a PE separator and an electrolyte that is a solution obtained by dissolving 1 mole of $LiPF_6$ in a mixture solvent of ethylene carbonate (EC) and dimethyl carbonate (DMC) (at a volume ratio of 1:1) according to assembly order. For a three-cell, a particularly designed cell was employed, and a working electrode of the synthesized anode composite material, an auxiliary electrode of Li metal, a reference electrode of Li metal, and an electrolyte and a separator the same as used for the coil cell were used.

Example 2

An electrode and a cell were manufactured under the same conditions as in Example 1 except for heat treatment conditions of the anode composite material in Example 1 (heat treatment was performed at 850° C. in Example 2).

Example 3

An electrode and a cell were manufactured under the same conditions as in Example 1 except for the heat treatment conditions of the anode composite material in Example 1 (heat treatment was performed at 900° C. in Example 3).

Example 4

An electrode and a cell were manufactured under the same conditions as in Example 1 except for the heat treatment conditions of the anode composite material in Example 1 (heat treatment was performed at 1000° C. in Example 4).

Charge and Discharge Methods

Electrochemical properties of the electrodes manufactured in Examples 1 to 4 were evaluated to test performance of the electrodes.

An electrode was manufactured by applying a high-capacity $Li_2MnO_3$-based anode composite material to an anode by the foregoing electrode manufacture process, and a coin cell defined by the IEC standard 2032 was manufactured, followed by evaluating charge and discharge properties of the electrode cell. Charging and discharging the electrode cell were performed under charging and discharging conditions of constant current/constant voltage in a voltage range of 2.0 to 4.6 V, and results are listed in FIG. 4 and Tables 2 and 3. In addition, to identify oxidation and reduction behavior of lithium as an anode material of the electrode cell, the oxidation and reduction behavior was identified using a three-electrode cell at a scan rate of 0.05 mV/S in a charge and discharge voltage range of 2.0 to 4.9 V by a potential sweep method.

TABLE 2

| Items | Heat treatment temperature (° C.) | Capacity (1 cycle) | Capacity (20 cycles) | Retention rate (%) |
|---|---|---|---|---|
| Example 1 | 800 | 267 | 232 | 87 |
| Example 2 | 850 | 247 | 229 | 93 |
| Example 3 | 900 | 222 | 201 | 91 |
| Example 4 | 1000 | 206 | 191 | 93 |

Table 2 illustrates charge and discharge properties of the electrode cells that employ the $Li_2MnO_3$-based anode composite materials according to Examples 1 to 4, showing initial capacities after 1 cycle, capacities after 20 cycles and capacity retention rates after 20 cycles when the electrode cells (Examples 1 to 4) that employ the anode composite materials prepared in Examples 1 to 4 are discharged at a constant current of 0.1 C. Referring to Table 2, the initial capacities and capacities after 20 cycles of the synthesized anode composite materials tend to gradually decrease as heat treatment temperature (that is, sintering temperature) increases. In particular, the material of Example 1, which was heat-treated at 800° C., exhibits a highest initial capacity of 267 mAh/g but has a capacity retention rate after 20 cycles of 87%, which is lowest. Among the electrode cells in the examples of the present disclosure, the electrode cell sintered at 850° C. (that is, Example 2) is identified to be superior in initial capacity and capacity retention rate after cycles.

TABLE 3

| Items | Heat treatment temperature (° C.) | 0.1 C | 0.5 C | 1.0 C | Efficiency (%) |
|---|---|---|---|---|---|
| Example 1 | 800 | 267 | 232 | 213 | 80 |
| Example 2 | 850 | 247 | 217 | 202 | 82 |
| Example 3 | 900 | 222 | 192 | 176 | 79 |
| Example 4 | 1000 | 206 | 170 | 154 | 74 |

Table 3 illustrates capacity properties by rate of initial capacity of electrode cells that employ the $Li_2MnO_3$-based anode composite materials according to Examples 1 to 4 with respect to initial capacities. Table 3 shows that the electrode cell sintered at 800° C. in Example 1 is excellent in absolute capacity in all rate tests at 0.1 C, 0.5 C and 1.0 C. However, the electrode cell sintered at 850° C. (Example 2) exhibits superior efficiency in capacity discharged at a current of 1.0 C with respect to a discharged capacity of 0.1 C. As a result, sintering at 800° C. to 850° C. is preferable in view of initial capacity, absolute capacity and efficiency.

Figure 4:
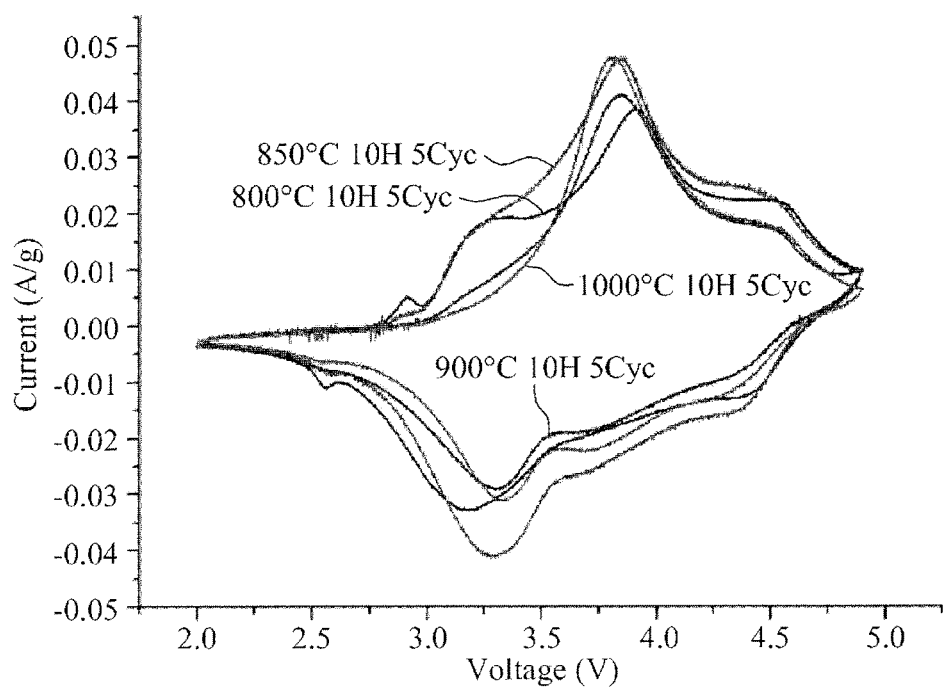
FIG. 4 illustrates electrochemical oxidation and reduction properties of the Li$_2$MnO$_3$-based anode composite materials Li(Li$_x$Ni$_y$Co$_z$Mn$_w$O$_{2+\alpha}$) prepared according to the examples of the present disclosure.

FIG. 4 illustrates electrochemical oxidation and reduction properties of the $Li_2MnO_3$-based anode composite materials $Li(Li_xNi_yCo_zMn_wO_{2+\alpha})$ prepared according to the examples of the present disclosure. Referring to FIG. 4, the electrochemical oxidation and reduction properties of the four anode composite materials obtained in Examples 1 to 4 of the present disclosure were evaluated using a three-electrode cell by a potential sweep method. FIG. 4 illustrates the oxidation and reduction properties after five cycles. Referring to FIG. 4, high oxidation (emission) peaks of lithium are formed at potentials of 2.9 V and 3.25 V as sintering temperature decreases. Particularly, the material sintered at 850° C. has a highest reduction peak (lithium absorption) and thus exhibits superior reversibility. These results correspond to the results listed in Tables 2 and 3.

According to the examples of the present disclosure, it is identified that the $Li_2MnO_3$-based anode composite materials tend to have a monoclinic structure depending on heat treatment temperature unlike $LiCoO_2$ (LCO) or $LiMnO_2$ (LMO) anode materials, and thus battery systems expected to exhibit a remarkably high capacity may be manufactured using anode composite material powder having a suitable monoclinic structure depending on appropriate heat treatment temperature. Further, according to the examples of the present disclosure, when the electrodes depending on heat treatment temperature are manufactured using the $Li_2MnO_3$-based anode composite materials and the coin cells are manufactured using the electrodes and charged and discharged in a range of 2.0 to 4.6 V to evaluate electrochemical properties, the cell heat treated at 800° C. has a highest initial capacity of 260 mAh/g or higher and the cell heat treated at 850° C. exhibits superior charge and discharge properties as electrochemical properties, specifically high-efficiency charge and discharge and life.

In particular, as a result of a test by a potential sweep method in a high voltage range of 0.2 to 4.9 V, when the $Li_2MnO_3$-based anode composite materials according to the present disclosure are subjected to a charge and discharge (oxidation and reduction) cycle test in 2.0 to 4.9 V, a charge voltage (oxidation peak) is about 3.9 V and a discharge voltage (reduction peak) is about 3.2 V. Particularly, in the sample sintered at 850° C. according to the present disclosure, a new oxidation peak (lithium desorption) occurs at a potential of 3.25 V and a peak with excellent reversibility appears in an electrochemical reduction reaction (lithium absorption) occurring at about 3.3 V. Such electrochemical properties are unique characteristics of the present disclosure, which are excellent properties showing excellent capacity retention properties by charge and discharge cycles.

Further, behavior of a remarkably high irreversible oxidation peak is identified in a range of about 4.5 to 4.9 V. This irreversible oxidation peak is a peak at which it is identified that LiO is oxidized. When all irreversible oxidation peaks are sufficiently reacted in a 1 cycle, as illustrated in FIG. 4, it is identified that potentials of oxidation and reduction peaks are largely moved to a negative (−) potential direction from a 2 cycle and thus an average discharge voltage depending on a cycle is moved in a negative (−) direction. It is assumed that electrochemical oxidation and reduction behavior in a high voltage range of 2.0 to 4.9 V is due to oxidation and decomposition of an organic electrolyte of a current lithium secondary battery and reactivity of the organic electrolyte with an anode material. In the present invention, a current organic electrolyte is preferably used in a voltage range of 2.0 to 4.6 V in order to obtain reversible conditions for cell use and a high voltage and high capacity of the cell. In addition, when a cell is manufactured by development and application an organic electrolyte and a solid electrolyte suitable for high voltage in the future, the cell is preferably charged and discharged in a high voltage range of 2.0 to 4.9 V.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in a different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. A method of preparing an anode composite material for a lithium secondary battery, the method comprising:
    mixing an aqueous nickel nitrate solution, an aqueous manganese nitrate solution, and an aqueous cobalt nitrate solution to form a starting material solution;
    combining the starting material solution with a complexing agent under basic pH conditions maintained through addition of an aqueous NaOH solution to form an anode composite material precursor through a coprecipitation reaction, the anode composite material precursor comprising $Li_2MnO_3$ in a mixture ratio of 21.3% to 29.2%;
    mixing the anode composite material precursor with $LiOH \cdot H_2O$ to form a mixed powder;
    subjecting the mixed powder to a first sintering process to form a synthesized powder; and
    subjecting the synthesized powder to a second sintering process to form an anode composite material powder comprising $Li(Li_xNi_yCo_zMn_wO_{2+\alpha})$, wherein x is 0.2 to 0.5, y is 0.1 to 0.2, z is 0.1 to 0.2, and w is 0.5 to 0.7.

2. The method of claim 1, wherein the anode composite material powder comprises $Li_{1.5}(Ni_{0.17}Mn_{0.66}Co_{0.17})O_2$.

3. The method of claim 1, wherein subjecting the mixed powder to a first sintering process comprises heating the mixed powder at a temperature of 500° C.

4. The method of claim 1, wherein subjecting the synthesized powder to a second sintering process comprises heating the synthesized powder at a temperature of 650° C. to 1000° C.

5. The method of claim 1, wherein the $Li(Li_xNi_yCo_zMn_wO_{2+\alpha})$ of the anode composite material powder exhibits two super lattice peaks at a temperature greater than or equal to 800° C.

6. The method of claim 1, wherein mixing an aqueous nickel nitrate solution, an aqueous manganese nitrate solution, and an aqueous cobalt nitrate solution comprises mixing $Ni(NO_3)_2 \cdot H_2O$, $Mn(NO_3)_2 \cdot H_2O$ and $Co(NO_3)_2 \cdot H_2O$ at a molar ratio of 1:4:1.

7. The method of claim 1, wherein combining the starting material solution with a complexing agent comprises combining the starting material solution with 0.8 mole ammonia water.

8. The method of claim 1, further comprising selecting the aqueous NaOH solution to comprise a 1 M aqueous NaOH solution prepared by dissolving NaOH powder in water.

9. The method of claim 1, wherein mixing the anode composite material precursor with $LiOH \cdot H_2O$ comprises adding 103% by weight (wt %) of the $LiOH \cdot H_2O$ to the anode composite material precursor.

10. The method of claim 1, wherein combining the starting material solution with a complexing agent under basic pH conditions maintained through addition of an aqueous NaOH solution comprises maintaining a pH of 11 through the addition of the aqueous NaOH solution.

11. The method of claim 1, wherein combining the starting material solution with a complexing agent under basic pH conditions maintained through addition of an aqueous NaOH solution comprises:
    titrating the starting material solution at a rate of about 4 milliliters per minute;
    titrating the complexing agent at a rate of about 4 milliliters per minute; and
    titrating the aqueous NaOH solution to maintain basic pH during the coprecipitation reaction.

12. A method of manufacturing an electrode of a lithium secondary battery, the method comprising:
    mixing an aqueous nickel nitrate solution, an aqueous manganese nitrate solution, and an aqueous cobalt nitrate solution to form a starting material solution;
    combining the starting material solution with a complexing agent under basic pH conditions maintained through addition of an aqueous NaOH solution to form an anode composite material precursor through a coprecipitation reaction, the anode composite material precursor comprising $Li_2MnO_3$ in a mixture ratio of 21.3% to 29.2%;
    mixing the anode composite material precursor with $LiOH \cdot H_2O$ to form a mixed powder;
    subjecting the mixed powder to a first sintering process to form a synthesized powder; and
    subjecting the synthesized powder to a second sintering process to form an anode composite material powder comprising $Li(Li_xNi_yCo_zMn_wO_{2+\alpha})$, wherein x is 0.2 to 0.5, y is 0.1 to 0.2, z is 0.1 to 0.2, and w is 0.5 to 0.7;
    mixing the anode composite material powder with a conductive agent and a binder to form a slurry;
    applying the slurry to a foil structure to form a slurry film;
    drying the slurry film to form a dried slurry film;
    pressing the dried slurry film to form a pressed slurry film;
    punching the pressed slurry film to form an anode; and
    forming a cell using the anode.

13. The method of claim 12, wherein forming a cell using the anode comprises forming a coin cell or three-electrode cell.

14. The method of claim 13, wherein forming a cell comprises forming the coin cell, the coin cell comprising the anode, a cathode of lithium metal, a PE separator as a separator membrane, and an electrolyte obtained by dissolving 1 mole of $LiPF_6$ in a mixture of ethylene carbonate and dimethyl carbonate at a volume ratio of 1:1.

15. The method of claim 13, wherein forming a cell comprises forming the three-electrode cell, the three-electrode cell comprising the anode, an auxiliary electrode of lithium metal, a reference electrode of lithium metal, a PE separator as a separator membrane, and an electrolyte obtained by dissolving 1 mole of $LiPF_6$ in a mixture solvent of ethylene carbonate and dimethyl carbonate at a volume ratio of 1:1.

16. The method of claim 12, wherein mixing the anode composite material powder with a conductive agent and a binder comprises mixing the anode composite material powder, the conductive agent, and the binder at a weight percentage (wt %) ratio of 80:10:10.

17. The method of claim 12, wherein applying the slurry to a foil comprises applying the slurry to aluminum foil to a thickness of 100 μm to 110 μm.

18. The method of claim 17, wherein pressing the dried slurry film comprises forming the pressed slurry film to exhibit a thickness of 60 μm to 70 μm on the aluminum foil.

19. A method of charging and discharging a lithium secondary battery which repeats charging and discharging of a cell with a constant current and a constant voltage in a range of 2.0 to 4.6 V, the cell comprising an anode formed by the process comprising:
- mixing an aqueous nickel nitrate solution, an aqueous manganese nitrate solution, and an aqueous cobalt nitrate solution to form a starting material solution;
- combining the starting material solution with a complexing agent under basic pH conditions maintained through addition of an aqueous NaOH solution to form an anode composite material precursor through a coprecipitation reaction, the anode composite material precursor comprising $Li_2MnO_3$ in a mixture ratio of 21.3% to 29.2%;
- mixing the anode composite material precursor with $LiOH \cdot H_2O$ to form a mixed powder;
- subjecting the mixed powder to a first sintering process to form a synthesized powder; and
- subjecting the synthesized powder to a second sintering process to form an anode composite material powder comprising $Li(Li_xNi_yCo_zMn_wO_{2+\alpha})$, wherein x is 0.2 to 0.5, y is 0.1 to 0.2, z is 0.1 to 0.2, and w is 0.5 to 0.7.

20. The method of claim 19, wherein oxidation and reduction behavior of lithium as an anode material of the cell is identified using a three-electrode cell at a scan rate of 0.05 mV/S in a charge and discharge voltage range of 2.0 to 4.9 V by a potential sweep method.

* * * * *